(12) United States Patent
Hagio et al.

(10) Patent No.: US 10,906,815 B2
(45) Date of Patent: Feb. 2, 2021

(54) AFX-STRUCTURE ZEOLITE CRYSTAL, AND SYNTHESIS METHOD THEREOF

(71) Applicant: NGK INSULATORS, LTD., Nagoya (JP)

(72) Inventors: Takeshi Hagio, Inazawa (JP); Kenichi Noda, Nagoya (JP); Makoto Miyahara, Tajimi (JP); Katsuya Shimizu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/572,841

(22) Filed: Sep. 17, 2019

(65) Prior Publication Data

US 2020/0031680 A1 Jan. 30, 2020

Related U.S. Application Data

(63) Continuation of application No. PCT/JP2018/010205, filed on Mar. 15, 2018.

(30) Foreign Application Priority Data

Mar. 31, 2017 (JP) .................. 2017-071539

(51) Int. Cl.
| | | |
|---|---|---|
| *C01B 39/48* | (2006.01) | |
| *B01J 29/70* | (2006.01) | |
| *C01B 39/54* | (2006.01) | |
| *B01J 29/83* | (2006.01) | |
| *B01J 29/85* | (2006.01) | |
| *B01J 20/18* | (2006.01) | |

(52) U.S. Cl.
CPC ............... *C01B 39/48* (2013.01); *B01J 29/83* (2013.01); *B01J 29/85* (2013.01); *C01B 39/54* (2013.01); *B01J 20/18* (2013.01); *B01J 29/70* (2013.01); *C01P 2002/20* (2013.01); *C01P 2002/72* (2013.01); *C01P 2002/74* (2013.01); *C01P 2004/03* (2013.01)

(58) Field of Classification Search
CPC ..... C01B 39/48; C01B 39/54; C01P 2002/20; C01P 2002/74; B01J 29/70; B01J 29/83; B01J 29/85
See application file for complete search history.

(56) References Cited

U.S. PATENT DOCUMENTS 9,764,313 B2 * 9/2017 Trukhan ................. B01J 35/002
2017/0348679 A1 12/2017 Naraki

FOREIGN PATENT DOCUMENTS

| JP | 2016-169139 A1 | 9/2016 |
| JP | 2016-204245 A1 | 12/2016 |
| WO | 2016/125850 A1 | 8/2016 |

OTHER PUBLICATIONS

Wu et al, "Synthesis of SAPO-56 with controlled crystal size", J. Nanopart Res (2017) 19:93 (Year: 2017).*

(Continued)

*Primary Examiner* — David M Brunsman
(74) *Attorney, Agent, or Firm* — Burr & Brown, PLLC

(57) ABSTRACT

A zeolite crystal has an AFX structure and a hexagonal plate shape. Ratio of a maximum Feret diameter (L1) in a plan view with respect to a plate thickness in a side view is greater than or equal to 2.

10 Claims, 4 Drawing Sheets

(56) References Cited

OTHER PUBLICATIONS

Jeon et al, "Catalytic evaluation of small-pore molecular sieve with different framework topologies for the synthesis of methylamines ", Applied Catalysis A: General 305 (2006) 70-78 (Year: 2006).*
Ayano Ootsuka, et al., "Particle Size Control of SAPO-56 with AFX Topology and Its Application to MTO Reaction," *Proceedings of the Chemical Society of Japan*, 89[1], (2009), p. 518 (with English translation).
Pingyun Feng, et al., "Synthesis and Single Crystal Structure of an AFX-type Magnesium Aluminophosphate," *Microporous and Mesoporous Materials*, 2001, 50(2001), 145-149.
Dustin W. Fickel et al., "The Ammonia Selective Catalytic Reduction Activity of Copper-Exchanged Small-Pore Zeolites," *Applied Catalysis B: Environmental, 2011*, 102(2011), 441-448.
International Search Report and Written Opinion (Application No. PCT/JP2018/010205) dated Apr. 10, 2018.
English translation of International Preliminary Report on Patentability (Chapter I) (Application No. PCT/JP2018/010205) dated Oct. 10, 2019, 6 pages.

* cited by examiner

US 10,906,815 B2

AFX-STRUCTURE ZEOLITE CRYSTAL, AND SYNTHESIS METHOD THEREOF

This application is a continuation of PCT/JP2018/010205, filed Mar. 15, 2018.

TECHNICAL FIELD

The present invention relates to an AFX-structure zeolite crystal and to a synthesis method for the same.

BACKGROUND ART

Typically, it is known that an AFX-structure zeolite is used as an adsorption agent or catalyst.

Non-Patent Literature 1 (Proceedings of the Chemical Society of Japan, 89[1], (2009), p. 518, "Particle size control of SAPO-56 with AFX topology and its application to MTO reaction") discloses an AFX-structure zeolite crystal that is hydrothermally synthesized from a mixture of a structure-directing agent, fumed silica, aluminum hydroxide, phosphoric acid, water and AFX-structure zeolite seed crystals. The AFX-structure zeolite crystals as disclosed in Non-Patent Literature 1 have an irregular shape.

Non-Patent Literature 2 (MICROPOROUS AND MESOPOROUS MATERIALS, 50, (2001), 145-149, "Synthesis and single crystal structure of an AFX-type magnesium aluminophosphate") discloses an AFX-structure zeolite crystal that is hydrothermally synthesized from a mixture of a structure-directing agent, aluminum isopropoxide, phosphoric acid, ethylene glycol, and magnesium hydrogen phosphate trihydrate. The AFX-structure zeolite crystals as disclosed in Non-Patent Literature 2 have a hexagonal bipyramid shape.

Patent Literature 1 (Japanese Patent Application Laid-Open No. 2016-169139) discloses an AFX-structure zeolite crystal that is hydrothermally synthesized from a mixture of a structure-directing agent, sodium hydroxide and Y-structure zeolite seed crystals. The AFX-structure zeolite crystals as disclosed in Patent Literature 1 have a hexagonal bipyramid shape.

SUMMARY

However, the AFX-structure zeolite crystal disclosed in Non-Patent Literature 1 has an irregular shape and the associated crystallinity is not high. Consequently, there is the problem that durability as an adsorption agent or catalyst is low.

Furthermore, the AFX-structure zeolite crystals disclosed in Non-Patent Literature 2 and Patent Literature 1 have a hexagonal bipyramid shape with high crystallinity that reflects a crystal structure that belongs to the hexagonal crystal types having an AFX structure. However, those crystals have an isotropic shape and accordingly have a large distance from the surface to the center. Therefore, a substance has difficulty in reaching a material to the crystal center and thus the problem arises that the overall crystal has difficulty in functioning effectively as an adsorption agent or catalyst.

The present invention is proposed in light of the situation described above, and has the object of providing an AFX-structure zeolite crystal having a high crystallinity hexagonal plate shape, and a synthesis method for the same.

An AFX-structure zeolite crystal according to the present invention has a hexagonal plate shape, and a ratio of a maximum Feret diameter in a plan view with respect to a plate thickness in a side view is greater than or equal to 2.

The present invention enables provision of an AFX-structure zeolite crystal having a high crystallinity hexagonal plate shape, and a synthesis method for the same.

DESCRIPTION OF EMBODIMENTS

AFX-Structure Zeolite Crystal

Figure 1:
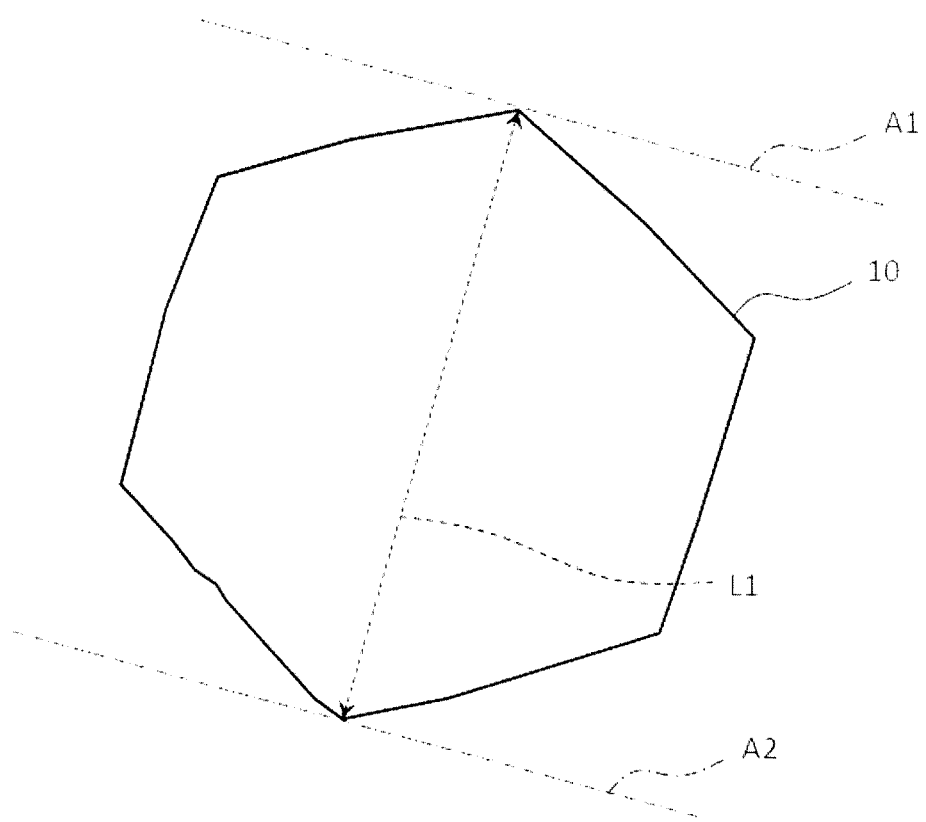
FIG. 1 is a plan view of a zeolite crystal having an AFX structure.
Figure 2:
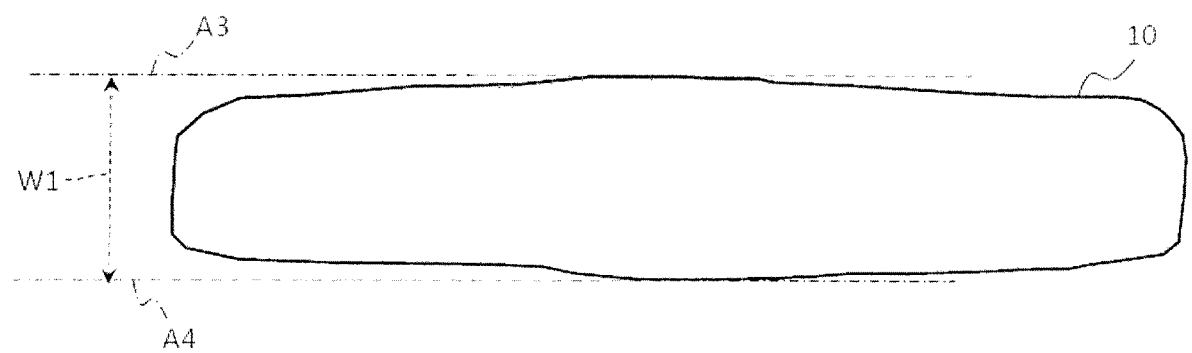
FIG. 2 is a side view of a zeolite crystal having an AFX structure.

FIG. 1 is a plan view of a zeolite crystal 10 having an AFX structure according to the present embodiment. FIG. 2 is a side view of a zeolite crystal 10 having an AFX structure according to the present embodiment.

In the following description, the zeolite crystal 10 having an AFX structure is abbreviated to "AFX crystal 10."

The AFX crystal 10 is a crystal constituted by a zeolite having an AFX structure. An AFX structure refers to a type of structure that meets the definition of an AFX type structure under the IUPAC structure codes as defined by the Structure Commission of the International Zeolite Association.

Zeolites constituting AFX crystals 10 include a zeolite in which atoms (T atoms) located at the center of the oxygen tetrahedrons ($TO_4$) constituting the zeolite are constituted by silicon (Si) and aluminum (Al), an AlPO zeolite in which the T atoms are constituted by P (Phosphorous) and Al, a SAPO zeolite in which the T atoms are constituted by Si, Al, and P, a MAPSO zeolite in which the T atoms are constituted by magnesium (Mg), Si, Al, and P, and a ZnAPSO zeolite in which the T atoms are constituted by Zinc (Zn), Si, Al, and P, or the like. A portion of the T atoms may be substituted by other elements.

The AFX crystal 10 internally has a plurality of oxygen 8-membered ring pores. An oxygen 8-membered ring pore refers to a pore constituted by an oxygen 8-membered ring. An oxygen 8-membered ring is also simply referred to as an "8-membered ring", and is a portion in which the number of oxygen atoms constituting the pore framework is eight, and oxygen atoms are linked to the above-described T atoms to form a ring structure.

The AFX crystal 10 may contain a metal or metal ion for the purpose of providing a specific component with adsorption characteristics or catalytic activity. Examples of such a metal or metal ion include one or more selected from the group consisting of alkali metals, alkali earth metals, and transition metals. Although specific examples of transition metals include platinum (Pt), palladium (Pd), rhodium (Rh), silver (Ag), iron (Fe), copper (Cu), cobalt (Co), manganese (Mn) and indium (In), there is no limitation thereon.

As shown in FIG. 1, the AFX crystal 10 is formed in a hexagonal shape in a plan view. As shown in FIG. 2, the AFX crystal 10 is formed in a plate shape in a side view. In the present embodiment, the AFX crystal 10 has an external shape of hexagonal plate.

In this manner, the fact that the AFX crystal 10 has a hexagonal plate shape that reflects a crystal structure of AFX-structure that belongs to hexagonal crystal type means that the AFX crystal 10 exhibits high crystallinity in comparison for example to an AFX crystal having an irregular shape, a spherical shape, or an elliptical sphere. Therefore, durability can be enhanced with respect to use as an adsorption agent or catalyst.

As shown in FIG. 1, the AFX crystal 10 has a maximum Feret diameter L1 in a plan view. As shown in FIG. 2, the AFX crystal 10 has a plate thickness W1 in a side view. In the present embodiment, a ratio of the maximum Feret diameter L1 with respect to the plate thickness W1 (L1/W1 ratio) is greater than or equal to 2.

In this manner, a feature in which the L1/W1 ratio greater than or equal to 2 means that the AFX crystal 10 is flat. As a result, in comparison to AFX crystals having the same volume and an isotropic shape, the specific surface area of the AFX crystals 10 is larger and it is possible to reduce the distance from the surface to the center of the AFX crystals 10. Therefore, the overall crystal can act effectively as an adsorption agent or catalyst.

There is no particular limitation as long as the L1/W1 ratio is greater than or equal to 2. However higher values are preferred. In this manner, the crystal inner portion can more effectively act. Although there is no particular limitation on the upper limiting value of the L1/W1 ratio of the AFX crystals 10, the value may be configured as less than or equal to 50 for example.

In the present embodiment, the maximum Feret diameter L1 is the distance between 2 parallel straight lines A1, A2 that are configured to contact and sandwich an AFX crystal 10 with a maximum distance between the 2 parallel straight lines A1, A2, as shown in FIG. 1, when the AFX crystal 10 is seen in a plan view by use of an SEM (electron microscope). The planar shape of the AFX crystals 10 is hexagonal, and therefore the maximum Feret diameter L1 is approximately the same as the length of the longest diagonal in 3 diagonals passing through the approximate center of the AFX crystal 10 in a plan view.

Although there is no particular limitation on the maximum Feret diameter L1, it may for example be configured as greater than or equal to 0.1 μm and less than or equal to 50 μm. When the AFX crystals 10 are used as a catalyst, the maximum Feret diameter L1 is preferably less than or equal to 5 μm, and more preferably less than or equal to 1 μm. The catalytic activity can be enhanced in this manner. When the AFX crystals 10 are used as an adsorption agent, the maximum Feret diameter L1 is preferably greater than or equal to 1 μm and less than or equal to 25 μm, and more preferably greater than or equal to 2 μm and less than or equal to 10 μm. In this manner, adsorption performance can be maintained when used in a solution such as a waste liquid or the like, and recovery after use of the adsorption agent is facilitated by precipitation or filtration.

In the present embodiment, the plate thickness W1 is the distance between 2 parallel straight lines A3, A4 that are configured to contact and sandwich an AFX crystal 10 with a minimum distance between the 2 parallel straight lines A3, A4, as shown in FIG. 2, when the AFX crystal 10 is seen in a side view by use of an SEM (electron microscope). Therefore, the plate thickness W1 is the minimum Feret diameter in the side view.

Although there is no particular limitation on the plate thickness W1, it may for example be configured as greater than or equal to 0.05 μm and less than or equal to 15 μm. The plate thickness W1 of the AFX crystals 10 is preferably less than or equal to 3 μm, and more preferably less than or equal to 1 μm. In this manner, the crystal inner portion can more effectively function.

The peak intensity of a (004) plane is preferably 4.5 times or more, and more preferably 5 times or more, a peak intensity of a (110) plane in an X-ray diffraction pattern obtained by irradiation of X-rays to AFX crystals 10 using an of X-ray diffraction (XRD) method. The X-ray diffraction pattern can be obtained by irradiation of CuKα rays to AFX crystals 10 by use of an X-ray diffraction apparatus (manufactured by Rigaku Corporation, model Miniflex600). The X-ray output is 600 W (tube voltage: 40 kV, tube current: 15 mA), scan speed is 5 degrees/min, a scanning step is 0.02 degrees, and an Ni foil having a thickness of 0.015 mm is used as a CuKβ-ray filter. Furthermore, the measurement of the X-ray diffraction pattern was performed by tightly packing a measurement powder into a sample holder having a sufficient depth. A peak of the (004) plane is observed around 2θ=18 degrees and A peak of the (110) plane is observed around 2θ=13 degrees.

Method for Manufacturing AFX Crystals 10

1. Preparation of Seed Crystals

The seed crystals may include use of zeolite crystals having a DDR structure (referred to below as "DDR seed crystals") as described below. Furthermore, the seed crystals may include use of AFX crystals 10 synthesized by use of DDR seed crystals as described below. In addition, the seed crystals may include use of AFX crystals 10 that have been synthesized using AFX crystals 10 as seed crystals.

After acquisition of AFX crystals 10 according to the present embodiment, the AFX crystals 10 may be used as seed crystals without modification, or in the event that AFX crystals 10 according to the present embodiment cannot be obtained, DDR seed crystals may be prepared according to the following description.

The DDR seed crystals may be prepared according to the method disclosed in PCT Laid Open Application 2010/90049.

It is preferred that the DDR seed crystals prepared by this method are used without modification as seed crystals. However, a configuration in which the DDR seed crystals are suitable crushed may also be used as seed crystals.

It is preferred that a plane parallel to the R plane ({012} plane) is exposed on the surface of each of the DDR seed crystals. The exposure of the R plane means that the crystallinity of the DDR seed crystals is high and that a superior base is provided to promote a-axis growth of AFX crystals. Consequently, the exposure of the R plane on the crystal surface enhances the crystallinity of the AFX crystals 10 that have been synthesized using those crystals as seed crystals and enables a configuration in the form of a hexagonal plate. Furthermore, it is preferred that the particle diameter of the DDR seed crystals is less than or equal to 1 μm, and more preferably less than or equal to 0.3 μm. When the DDR seed crystals have a large particle diameter, there is the possibility that there will be residual DDR seed crystals during AFX crystal growth.

It is noted that the crystal plane that is exposed on the surface of the DDR seed crystals can be confirmed by use of a transmission electron microscope (TEM). Furthermore, exposure of the R plane on the surface of the DDR seed crystals is possible by adjusting the synthesis conditions such as starting material composition, pH or the like, and controlling the crystal plane that arrives on the crystal surface, for example.

2. Preparation of Starting Material Solution

A starting material solution is prepared by dissolving or dispersing a T atom sources such as a silicon source, an aluminum source, a phosphorous source or the like and a structure-directing agent (SDA) in pure water. T atoms preferably include two or more of Si, Al and P, and more preferably include at least Al, P and O because the crystallinity of AFX can be improved.

Colloidal silica, fumed silica, tetraethoxysilane, sodium silicate, or the like can be used as a silicon source, for example. Aluminum isopropoxide, aluminum hydroxide, Boehmite, sodium aluminate, an alumina sol, or the like can be used as an aluminum source, for example. Phosphoric acid, sodium dihydrogen phosphate, ammonium dihydrogen phosphate, or the like can be used as a phosphorous source, for example. N,N,N',N'-tetramethyl diaminohexane, tetraethylammonium hydroxide, 1,4-diazabicyclo[2,2,2]octane-C4-diquat dibromide, 1,3-di(1-adamantyl) imidazolium dibromide, or the like can be used as a structure-directing agent, for example.

3. Synthesis of AFX Crystals 10

The seed crystals as described above are added to the prepared starting material solution, the mixture is placed in a pressure vessel, and hydrothermal synthesis is performed (160 to 200 degrees C., 15 to 100 hours) to thereby synthesize the AFX crystals 10. When using DDR seed crystals, temperature of the hydrothermal synthesis is preferably 180 degrees C. to 200 degrees C. in order to prevent residual DDR seed crystals.

Then the synthesized AFX crystals 10 are recovered, sufficiently washed with pure water, and then completely dried at a predetermined temperature (65 to 120 degrees C.).

EXAMPLES

An example of the present invention will be described below. However, the present invention is not limited to the example described below.

Example 1

In Example 1, AFX crystals were synthesized by use of DDR seed crystals.

Firstly, DDR seed crystals were synthesized by hydrothermal synthesis (160 degrees C., 16 hours) with reference to the method disclosed in PCT Laid Open Application 2010/90049 as referenced above, and then sufficiently washed. The average particle diameter of the DDR seed crystals was 196 nm. Furthermore, the DDR seed crystals had high crystallinity with exposing a {024} plane, that is parallel to the R plane, on the surface of the crystals.

Next, colloidal silica as a silicon source, aluminum isopropoxide as an aluminum source, 85% phosphoric acid as a phosphorous source, and N,N,N',N'-tetramethyl diaminohexane as a structure-directing agent were dissolved in pure water to thereby prepare a starting material solution having a composition of 4.1 SDA:1.7 $SiO_2$:1$Al_2O_3$:2.1$P_2O_5$:1525 $H_2O$.

Next, 0.3 g of seed crystals were added to 40 g of the starting material solution, the mixture was placed in a pressure vessel, and hydrothermal synthesis (190 degrees C., 20 hours) was performed.

Then, after recovery of the crystals that resulted from the hydrothermal synthesis and sufficient washing with pure water, the crystals were dried at 120 degrees C.

Figure 3:
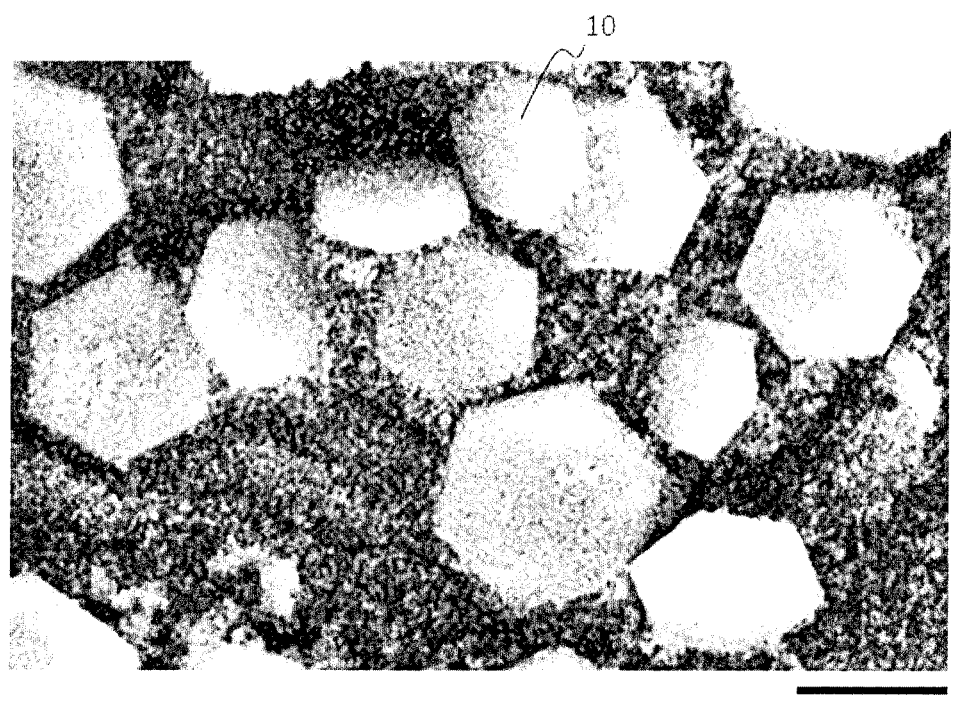
FIG. 3 is an SEM image of a zeolite crystal having an AFX structure according to Example 1.
Figure 4:
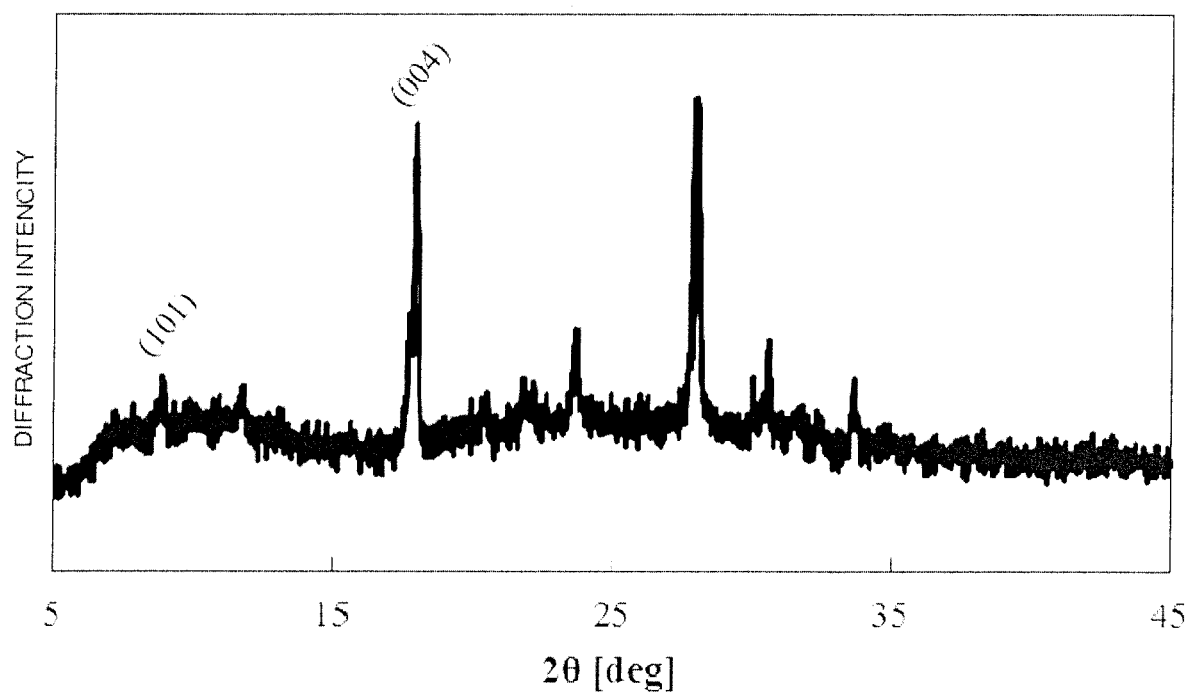
FIG. 4 is an XRD pattern of a zeolite crystal having an AFX structure according to Example 1.

Thereafter, the crystal phase was determined by X-ray diffraction measurement, and the outer shape of the crystals was observed by SEM. As shown in FIG. 3, the resulting crystals were hexagonal plate shaped AFX crystals. The maximum Feret diameter in a plan view of the AFX crystals was 2 to 6 µm, and the L1/W1 ratio of the AFX crystals was 2.5 to 5. Furthermore, as shown in FIG. 4, the peak intensity of the (004) plane (c plane) was 9.7 times the peak intensity of the (110) plane in an X-ray diffraction pattern obtained by irradiation of X-rays to the AFX powder sufficiently filled in a sample holder.

Example 2

In Example 2, AFX crystals were also synthesized using DDR seed crystals.

Firstly, a DDR seed crystal was prepared using the same method as that of Example 1, except that the composition of the starting materials was changed. The average particle diameter of the DDR seed crystals was 190 nm. Furthermore, the DDR seed crystals had high crystallinity with exposing a {024} plane, that is parallel to the R plane, on the surface of the crystals.

Next, colloidal silica as a silicon source, aluminum isopropoxide as an aluminum source, 85% phosphoric acid as a phosphorous source, and N,N,N',N'-tetramethyl diaminohexane as a structure-directing agent were dissolved in pure water to thereby prepare a starting material solution having a composition of 2.5 SDA:0.8 $SiO_2$:1 $Al_2O_3$:1.3 $P_2O_5$:50 $H_2O$.

Next, 0.15 g of seed crystals were added to 86 g of the starting material solution, the mixture was placed in a pressure vessel, and hydrothermal synthesis (190 degrees C., 50 hours) was performed.

Then, after recovery of the crystals that resulted from the hydrothermal synthesis and sufficient washing with pure water, the crystals were dried at 65 degrees C.

Thereafter, the crystal phase was determined by X-ray diffraction measurement, and the outer shape of the crystals was observed by SEM. The resulting crystals were hexagonal plate shaped AFX crystals. The maximum Feret diameter in a plan view of the AFX crystals was 10 to 25 µm, and the L1/W1 ratio of the AFX crystals was 3 to 3.5. Furthermore, the peak intensity of the (004) plane (c plane) was 61.7 times the peak intensity of the (110) plane in an X-ray diffraction pattern obtained by irradiation of X-rays to the AFX powder sufficiently filled in a sample holder.

Example 3

In Example 3, AFX crystals were synthesized using the AFX crystals synthesized in Example 1 as seed crystals.

Firstly, AFX crystals were synthesized using the method in Example 1 described above.

Next, colloidal silica as a silicon source, aluminum isopropoxide as an aluminum source, 85% phosphoric acid as a phosphorous source, and N,N,N',N'-tetramethyl diaminohexane as a structure-directing agent were dissolved in pure water to thereby prepare a starting material solution having a composition of 2.5 SDA:0.75 $SiO_2$:1 $Al_2O_3$:1.25 $P_2O_5$:50 $H_2O$.

Next, 0.15 g of AFX crystals as seed crystals were added to 86 g of the starting material solution, the mixture was placed in a pressure vessel, and hydrothermal synthesis (170 degrees C., 50 hours) was performed.

Then, after recovery of the crystals that resulted from the hydrothermal synthesis and sufficient washing with pure water, the crystals were completely dried at 65 degrees C.

Thereafter, the crystal phases were determined by X-ray diffraction measurement, and the outer shape of the crystals was observed by SEM. The resulting crystals were hexagonal plate shaped AFX crystals. The maximum Feret diameter in a plan view of the AFX crystals was 5 to 10 μm, and the L1/W1 ratio of the AFX crystals was 2.8 to 3.5. Furthermore, the peak intensity of the (004) plane (c plane) was 9.0 times the peak intensity of the (110) plane in an X-ray diffraction pattern obtained by irradiation of X-rays to the AFX powder sufficiently filled in a sample holder.

Example 4

In Example 4, AFX crystals were synthesized using a crushed DDR seed crystal.

Firstly, DDR crystals having low crystallinity were produced by crushing the DDR seed crystals, which were prepared using the same method as that of Example 1, with use of a bead mill for 90 minutes.

Next, colloidal silica as a silicon source, aluminum isopropoxide as an aluminum source, 85% phosphoric acid as a phosphorous source, and N,N,N',N'-tetramethyl diaminohexane as a structure-directing agent were dissolved in pure water to thereby prepare a starting material solution having a composition of 2.5 SDA:0.75 $SiO_2$:1 $Al_2O_3$:1.25 $P_2O_5$:50 $H_2O$.

Next, 0.2 g of low crystallinity DDR crystals as seed crystals were added to 86 g of the starting material solution, the mixture was placed in a pressure vessel, and hydrothermal synthesis (195 degrees C., 30 hours) was performed.

Then, after recovery of the crystals that resulted from the hydrothermal synthesis and sufficient washing with pure water, the crystals were completely dried at 65 degrees C.

Thereafter, the crystal phases were determined by X-ray diffraction measurement, and the outer shape of the crystals was observed by SEM. The resulting crystals were hexagonal plate shaped AFX crystals. However, although the planar shape of the AFX crystals in Example 4 was hexagonal, their symmetry was low when compared to the hexagonal shape of the AFX crystals in Example 1. The maximum Feret diameter in a plan view of the AFX crystals was 1 to 5 μm, and the L1/W1 ratio of the AFX crystals was 2.5 to 3. Furthermore, the peak intensity of the (004) plane (c plane) was 5.0 times the peak intensity of the (101) plane in an X-ray diffraction pattern obtained by irradiation of X-rays to the AFX powder sufficiently filled in a sample holder.

Comparative Example 1

In Comparative Example 1, AFX crystals were synthesized without a seed crystal.

Colloidal silica as a silicon source, aluminum isopropoxide as an aluminum source, 85% phosphoric acid as a phosphorous source, and N,N,N',N'-tetramethyl diaminohexane as a structure-directing agent were dissolved in pure water to thereby prepare a starting material solution having a composition of 2.5 SDA:0.75 $SiO_2$:1 $Al_2O_3$:1.25 $P_2O_5$:50 $H_2O$.

Next, 86 g of the starting material solution was placed in a pressure vessel, and hydrothermal synthesis (170 degrees C., 50 hours) was performed.

Then, after recovery of the crystals that resulted from the hydrothermal synthesis and sufficient washing with pure water, the crystals were completely dried at 65 degrees C.

Thereafter, the crystal phases were determined by X-ray diffraction measurement, and the outer shape of the crystals was observed by SEM. The resulting crystals were non-plate shaped irregular AFX crystals.

Comparative Example 2

In Comparative Example 2, AFX crystals were synthesized using the irregular AFX crystals synthesized in Comparative Example 1 as seed crystals.

Firstly, irregular AFX crystals were synthesized using the method in Comparative Example 1 described above.

Next, colloidal silica as a silicon source, aluminum isopropoxide as an aluminum source, 85% phosphoric acid as a phosphorous source, and N,N,N',N'-tetramethyl diaminohexane as a structure-directing agent were dissolved in pure water to thereby prepare a starting material solution having a composition of 2.5 SDA:0.75 $SiO_2$:1 $Al_2O_3$:1.25 $P_2O_5$:50 $H_2O$.

Next, 0.1 g of irregular AFX crystals were added to 86 g of the starting material solution, the mixture was placed in a pressure vessel, and hydrothermal synthesis (195 degrees C., 50 hours) was performed.

Then, after recovery of the crystals that resulted from the hydrothermal synthesis and sufficient washing with pure water, the crystals were completely dried at 65 degrees C.

Thereafter, the crystal phases were determined by X-ray diffraction measurement, and the outer shape of the crystals was observed by SEM. In the same manner as Comparative Example 1, the resulting crystals were irregular and disc-shaped AFX crystals.

OBSERVATIONS

As described above, Examples 1, 2 and 4 in which AFX crystals were synthesized using DDR crystals as seed crystals and Example 3 in which hexagonal AFX crystals were used as seed crystals obtained hexagonal plate-shaped AFX crystals. In this manner AFX crystals having high crystallinity exhibit sufficient durability during use as an adsorption agent or catalyst.

Furthermore, in Examples 1 to 4, the L1/W1 ratio of the AFX crystals could be configured to be greater than or equal to 2. In comparison to AFX crystals having the same volume and an isotropic shape, the specific surface area of the AFX crystals is larger and it is possible to reduce the distance from the surface to the center of the AFX crystals. Therefore, the overall crystal can function effectively as an adsorption agent or catalyst.

On the other hand, Comparative Example 1 in which AFX crystals were synthesized without a seed crystal and Comparative Example 2 in which irregular AFX crystals were used as seed crystals for the synthesis of AFX crystals could not obtain hexagonal plate shape AFX crystals.

The invention claimed is:

1. A zeolite crystal having an AFX structure and a hexagonal plate shape, wherein
   a ratio of a maximum Feret diameter in a plan view with respect to a plate thickness in a side view is greater than or equal to 2.

2. The zeolite crystal having an AFX structure according to claim 1, wherein
   the maximum Feret diameter is less than or equal to 50 μm.

3. The zeolite crystal having an AFX structure according to claim 2, wherein
   the maximum Feret diameter is less than or equal to 25 μm.

4. The zeolite crystal having an AFX structure according to claim 1, wherein
the ratio of the maximum Feret diameter with respect to the plate thickness is greater than or equal to 2.5.

5. The zeolite crystal having an AFX structure according to claim 1, the zeolite crystal comprising two or more of Si, Al and P.

6. The zeolite crystal having an AFX structure according to claim 5, the zeolite crystal comprising at least Al and P and O.

7. The zeolite crystal having an AFX structure according to claim 1, wherein
a peak intensity of a (004) plane is greater than or equal to 4.5 times a peak intensity of a (110) plane in an X-ray diffraction pattern obtained by irradiation of X rays.

8. A method for manufacturing a zeolite crystal having an AFX structure comprising:
adding zeolite crystals having an AFX structure according to claim 1 as seed crystals to a starting material solution containing a structure-directing agent and two or more of a silicon source, an aluminum source and a phosphorous source, and
synthesizing a zeolite crystal having an AFX structure by hydrothermal synthesis of the starting material solution containing the added seed crystals.

9. A method for manufacturing a zeolite crystal having an AFX structure comprising:
adding zeolite crystals having a DDR structure as seed crystals to a starting material solution containing a structure-directing agent and two or more of a silicon source, an aluminum source and a phosphorous source; and
synthesizing a zeolite crystal having an AFX structure by hydrothermal synthesis of the starting material solution containing the added seed crystals.

10. The method for manufacturing a zeolite crystal having an AFX structure according to claim 9, wherein
an {012} plane that is parallel to the R plane is exposed on a surface of the seed crystals.

* * * * *